United States Patent
Magno, Jr.

(10) Patent No.: US 9,574,692 B2
(45) Date of Patent: Feb. 21, 2017

(54) CONDUIT HUB WITH WIPER SEAL

(71) Applicant: Thomas & Betts International, Inc., Wilmington, DE (US)

(72) Inventor: Joey D. Magno, Jr., Cordova, TN (US)

(*) Notice: Subject to any disclaimer, the term of this patent is extended or adjusted under 35 U.S.C. 154(b) by 72 days.

(21) Appl. No.: 13/946,447

(22) Filed: Jul. 19, 2013

(65) Prior Publication Data

US 2014/0028019 A1   Jan. 30, 2014

Related U.S. Application Data

(60) Provisional application No. 61/676,089, filed on Jul. 26, 2012.

(51) Int. Cl.
F16L 19/00 (2006.01)
F16L 41/10 (2006.01)
F16L 15/04 (2006.01)
F16J 15/56 (2006.01)

(52) U.S. Cl.
CPC ............... F16L 41/10 (2013.01); F16J 15/56 (2013.01); F16L 15/04 (2013.01); F16L 19/00 (2013.01)

(58) Field of Classification Search
CPC ............. F16L 41/10; F16L 19/00; F16L 15/04
USPC ....... 285/220, 349, 355, 337, 347, 374, 333, 285/334, 110, 219; 280/276; 16/2.1–2.5; 277/908, 566, 567–568, 354, 314, 277/375–376, 397, 500, 549, 602, 925; 174/153 G, 152 G; 439/271, 272, 281, 439/559, 587
See application file for complete search history.

(56) References Cited

U.S. PATENT DOCUMENTS

| | | | | |
|---|---|---|---|---|
| 2,850,305 A | * | 9/1958 | Chadowski | H01O 1/1214 277/576 |
| 3,276,242 A | * | 10/1966 | Bird | G01N 30/8624 346/34 |
| 3,578,341 A | * | 5/1971 | Le Febrve | F16J 15/40 277/500 |
| 3,744,806 A | | 7/1973 | Keyser | |
| 3,866,923 A | * | 2/1975 | Gorman | 277/576 |
| 3,963,268 A | | 6/1976 | Widdicombe | |
| 4,022,262 A | | 5/1977 | Gunn | |
| 4,145,075 A | | 3/1979 | Holzmann | |
| 4,234,125 A | * | 11/1980 | Lieding | B05B 15/10 239/111 |

(Continued)

OTHER PUBLICATIONS

UK Seals & Polymers Wiper Seals webpage, http://www.ukseals.com/products/hydraulic-pneumatic/wiper-seals, accessed 20160206.*

(Continued)

Primary Examiner — Matthieu Setliff
Assistant Examiner — Jay R Ripley
(74) Attorney, Agent, or Firm — Taft Stettinius & Hollister LLP (57) ABSTRACT

A conduit hub includes a conduit hub body having a cylindrical inner surface configured to receive an end of a cylindrical conduit having a male thread, wherein the conduit hub body includes a female thread and a counterbore formed in an outer rim of the cylindrical inner surface. The conduit hub further includes a wiper seal configured to fit into the counterbore such that a lip of the wiper seal extends beyond the outer rim of conduit hub body and a surface of the wiper seal engages with an outer surface of the cylindrical conduit, when the male thread of the cylindrical conduit is threaded to engage with the female thread of the conduit hub body, to resist the ingress of moisture, dirt or contaminants into the conduit hub or the conduit.

19 Claims, 6 Drawing Sheets

(56) References Cited

U.S. PATENT DOCUMENTS

| | | | | |
|---|---|---|---|---|
| 4,369,977 | A | * | 1/1983 | Bishop ................ F16J 15/3232 166/99 |
| 4,496,490 | A | * | 1/1985 | Larkin ................ C07F 7/2268 524/180 |
| 4,544,800 | A | | 10/1985 | Katsuura |
| 4,561,669 | A | * | 12/1985 | Simons .......................... 280/276 |
| 4,692,562 | A | | 9/1987 | Nattel |
| 4,706,997 | A | * | 11/1987 | Carstensen ........... E21B 17/042 285/13 |
| 4,810,832 | A | | 3/1989 | Spinner et al. |
| 4,814,547 | A | | 3/1989 | Riley et al. |
| 4,960,342 | A | * | 10/1990 | Chi ........................ B62K 21/18 280/279 |
| 5,288,087 | A | | 2/1994 | Bertoldo |
| 5,382,037 | A | * | 1/1995 | Chang et al. ................ 280/276 |
| 5,511,518 | A | | 4/1996 | Jain et al. |
| 5,843,532 | A | * | 12/1998 | Dodds ........................ 427/430.1 |
| 6,773,039 | B2 | | 8/2004 | Muenster et al. |
| 7,097,500 | B2 | * | 8/2006 | Montena ................ H01R 9/05 439/587 |
| 7,404,581 | B2 | | 7/2008 | Baving et al. |
| 7,408,122 | B2 | | 8/2008 | Heimlicher et al. |
| 8,038,180 | B2 | | 10/2011 | Williams et al. |
| 2008/0007012 | A1 | * | 1/2008 | Jeong ................ F15B 15/1433 277/510 |
| 2009/0205913 | A1 | * | 8/2009 | Hart ...................... F16F 9/3285 188/267.2 |
| 2011/0233925 | A1 | * | 9/2011 | Pina ........................ F16L 15/04 285/333 |

OTHER PUBLICATIONS

SKF Wiper Seals webpage and chart of standard shapes, http://www.skf.com/us/products/seals/industrial-seals/machined-seals/fluid-power-seals/wiper-seals/index.html, accessed 20160206.*

* cited by examiner

PTFE

CONDUIT HUB WITH WIPER SEAL

CROSS-REFERENCE TO RELATED APPLICATION

This application claims priority under 35 U.S.C. §119, based on U.S. Provisional Application No. 61/676,089, filed Jul. 26, 2012, the disclosure of which is hereby incorporated by reference herein.

BACKGROUND

Current conduit bodies and fittings for electrical conduit systems use the National Pipe Thread (NPT) standard to fasten and connect them together. An electrical conduit includes an electrical piping system used in the routing of electrical wiring that provides protection of the enclosed wiring from impact, moisture and chemical vapors. Electrical conduit systems, however, are susceptible to internal condensation due to temperature changes at different areas within the conduit systems. Additionally, since the threaded connections of the conduit systems need to carry grounding connectivity, they are typically installed without Teflon tape or other means to ensure positive sealing between the threaded connections. In food and beverage environments (or other environments having water), liquid ingress is a prevalent problem where periodic high pressure wash-down occurs for cleaning and sterilization. In such environments, the liquid eventually makes its way to the lowest part of the conduit system, which is typically the conduit junction box. Consequently, any exposed threads on the conduits that may exist after tightening the conduits to the conduit hub can permit the passage of liquids, dirt, contaminants and bacteria, which can then settle within the conduit system.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

A conduit hub, as described herein, includes an additional wiper seal that may be set into a slot formed in an outer rim of a body of the conduit hub. When a conduit is threaded into the conduit hub to tighten the conduit into the conduit hub, the male thread of the conduit is covered fully by the wiper seal such that the wiper seal keeps out moisture, dirt and contaminants by keeping a tight seal against the smooth outer diameter of the conduit. The conduit hub, with the additional wiper seal, may have an IP69K rating in the International Electrotechnical Commission (IEC) 60529 rating system, where "IP" refers to the wiper seal's ability to resist the ingress of dust, and "69K" refers to the wiper seal's ability to resist the ingress of high temperature steam or high pressure water. The conduit hub, with the additional wiper seal, may have a National Electrical Manufacturer's Association (NEMA) 4× rating that indicates that the conduit hub may be used indoors or outdoors to provide a degree of protection against corrosion, windblown dust and rain, splashing water, and hose directed water, and should be undamaged by ice which forms on the conduit hub.

FIGS. 1A, 1B, 2A and 2B depict various views of a conduit hub 100, that includes a conduit hub body 110 and wiper seal 115, where a conduit 105 is threaded into conduit hub body 110 such that wiper seal 115 seals against an outer surface of conduit 105 and resists the ingress of moisture, dust and/or contaminants into conduit 105 or conduit hub body 110. Conduit hub 100 may, for example, connect to a junction box or device enclosure (not shown). As shown in the cross-sectional view of FIG. 1A, conduit 105 may include a cylindrical conduit having an outer diameter of $d_{out}$ and a male thread configuration 125 at an end of conduit 105. As further shown in FIG. 1A, a female thread configuration 130 on a cylindrical inner surface of conduit hub body 110 may thread into male thread configuration 125 of conduit 105 as conduit 105 is tightened into conduit hub body 110. The cylindrical inner surface of conduit hub body 110 may have a diameter slightly larger than $d_{out}$ such that conduit 105 can be inserted into conduit hub body 110 and maintain a relatively tight fit. The turns of the threads of female thread configuration 130 of conduit hub body 110 may span a length $t_{female}$. The turns of the threads of male thread configuration 125 of conduit 105 may span a length $t_{male}$. Conduit 105 and conduit hub body 110 may be made of stainless steel or Bluekote® conduit/conduit bodies.

Figure 1A:
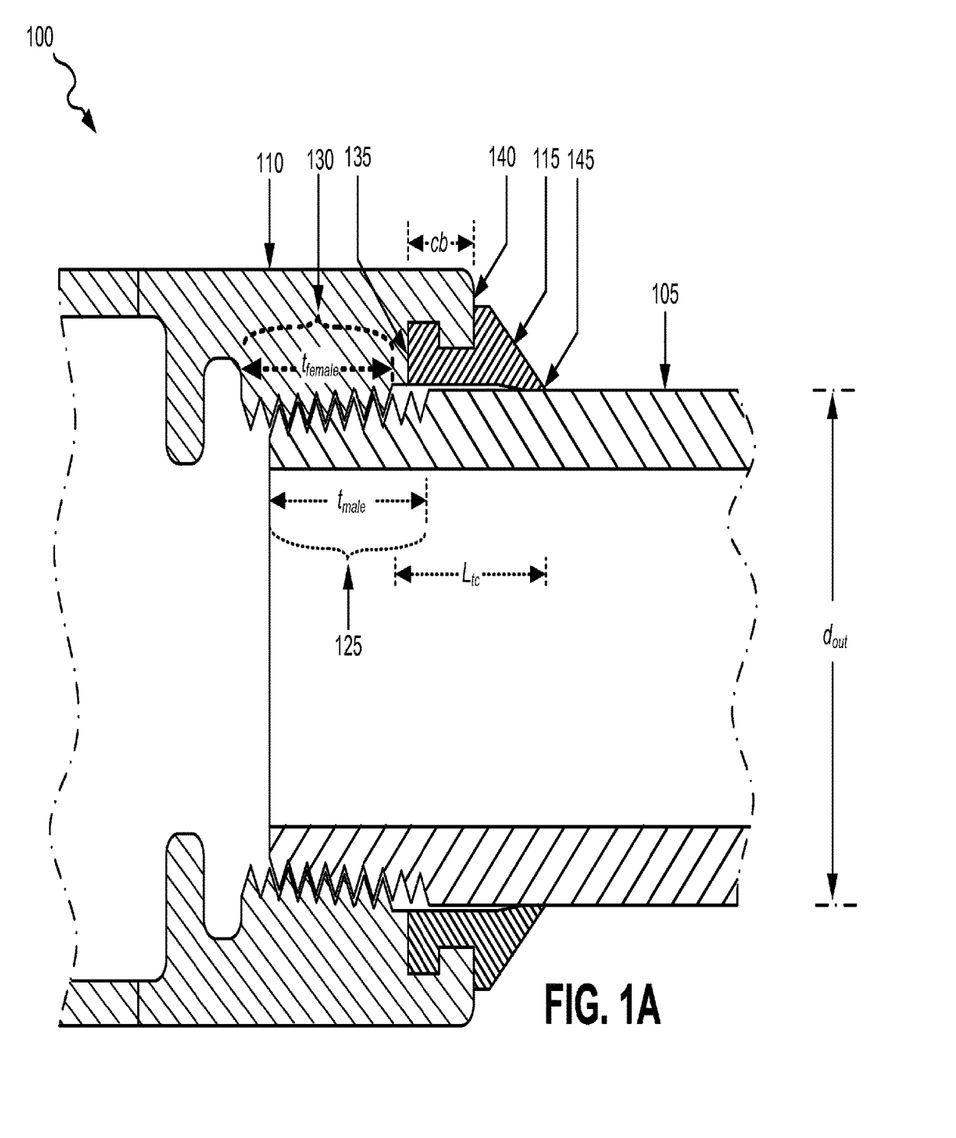
FIG. 1A is a diagram that illustrates a cross-sectional cut away view of a conduit threaded into a conduit hub having a wiper seal that resists the ingress of moisture, dust and/or contaminants into the conduit or the conduit hub body.

FIG. 1A also depicts a cut-away cross-sectional view of wiper seal 115. As shown, wiper seal 115 may be set into a counterbore 135 having a radial notch formed in the cylindrical inner surface of conduit hub body 110 at a distance cb from an outer rim 140 of hub body 110. Even with the set-back of female thread configuration 130 from the outer rim of conduit hub body due to counterbore 135, the length $t_{female}$ of the threads of female thread configuration 130 of conduit hub body 110 can be designed such that it is sufficient to meet the Underwriter Laboratories (UL) requirements for minimum thread engagement (e.g., with male threads 125 of conduit 105).

As shown in FIG. 1A, wiper seal 115 can be designed to span a distance $L_{tc}$ from female thread configuration 130 to cover all of the threads of male thread configuration 125 of conduit 105 when conduit 105 is sufficiently tightened into conduit hub body 110. When conduit 105 is tightened into conduit hub body 110, wiper seal 115 engages with, and creates a seal 145, with the smooth outer surface of conduit 105. The outer diameter $d_{out}$ of conduit 105 is larger than the inner diameter of wiper seal 115 causing a tight seal between the smooth outer surface of conduit 105 and the inner surface of wiper seal 115. Wiper seal 115 may be made from a single piece of flexible material that will create an adequate seal against the outer surface of conduit 105. In one embodiment, wiper seal 115 may be made from Food and Drug Administration (FDA) approved polytetrafluoroethylene (PTFE). In other embodiments, wiper seal 115 may be made from more than one piece of material, and may be made from other types of materials other than PTFE. Counterbore 135 may be formed in conduit hub body 110 at the time that conduit hub body 110 is manufactured, or counterbore 135 may be machined (e.g., undercut) into an existing conduit hub body 110 sometime after conduit hub body 110 is manufactured. As shown, counterbore 135 may include a radial notch that circumscribes the entirety of the cylindrical inner surface of the outer rim of conduit hub body 110.

Figure 1B:
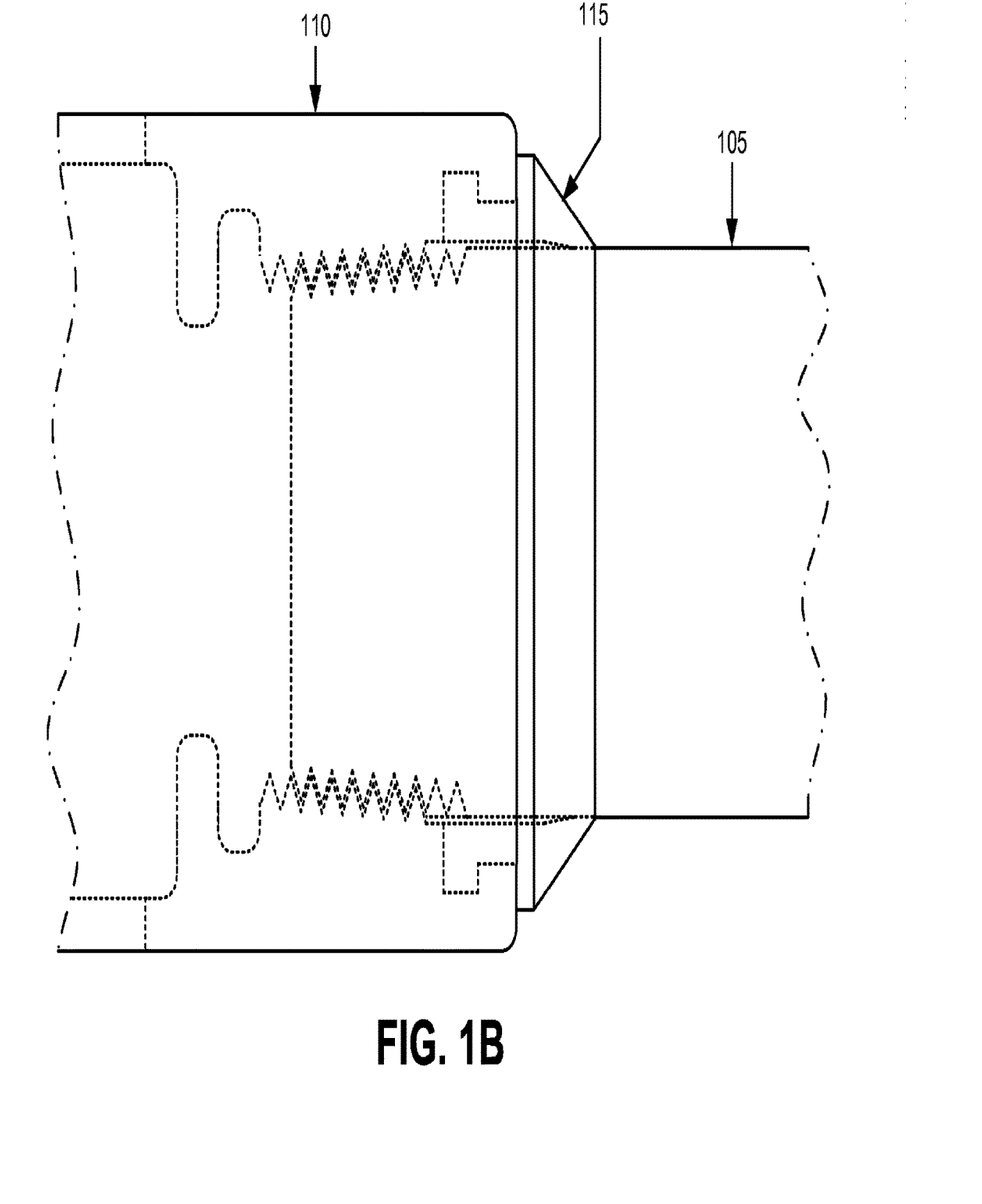
FIG. 1B is a diagram that illustrates an exterior "see through" view of the conduit hub body of FIG. 1A.
Figure 2:
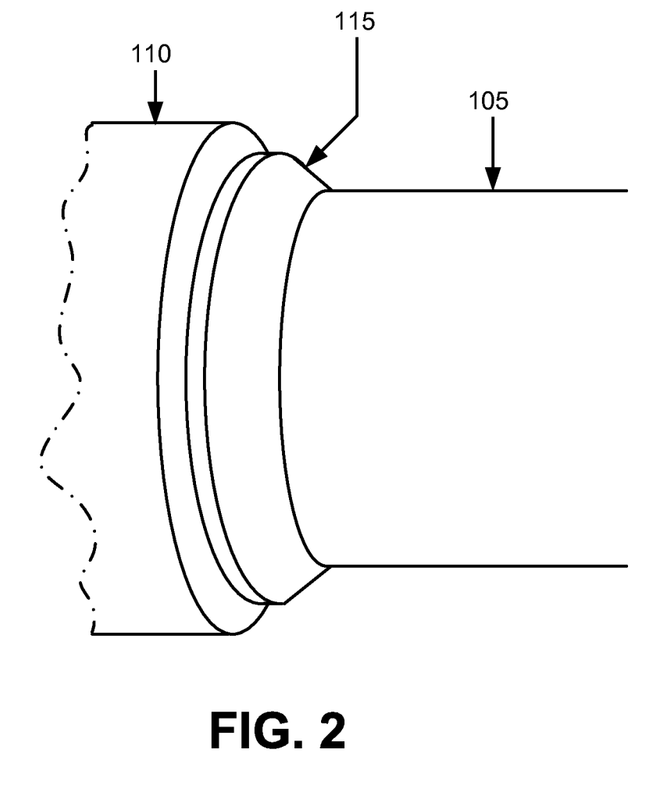
FIG. 2 is a diagram that illustrates an exterior three-dimensional view of the conduit hub body of FIG. 1A with the wiper seal sealed against the conduit when the conduit is tightened into the conduit hub body.

FIG. 1B depicts an exterior "see through" side view of conduit hub body 110. The exterior surface of wiper seal 115 as sealed against the smooth outer surface of conduit 105 can be clearly seen in FIG. 1B. FIG. 2 further depicts an exterior three-dimensional view of conduit hub body 110 with wiper seal 115 sealed against conduit 105 when conduit 105 is tightened into conduit hub body 110. The sealing of wiper seal 115 against conduit 105 ensures that the use of wiper seal 115 with conduit hub body 110 results in an IP69K rating within the IEC 60529 rating system, where IP refers to the wiper seal's ability to resist the ingress of dust, and 69K refers to the wiper seal's ability to resist the ingress of high temperature steam or high pressure water. To attain the IP69K rating, conduit hub body 110, wiper seal 115, and conduit 105 must be able to withstand high pressures and steam cleaning, with a test that uses a spray nozzle that is fed with 80 degrees Celsius water at 80-100 bar at a flow rate of 14-16 Liters/minute. The spray nozzle is held 10-15 cm, for example, from the tested unit at angles of 0, 30, 60 and 90 degrees for 30 seconds each.

Figure 3A:
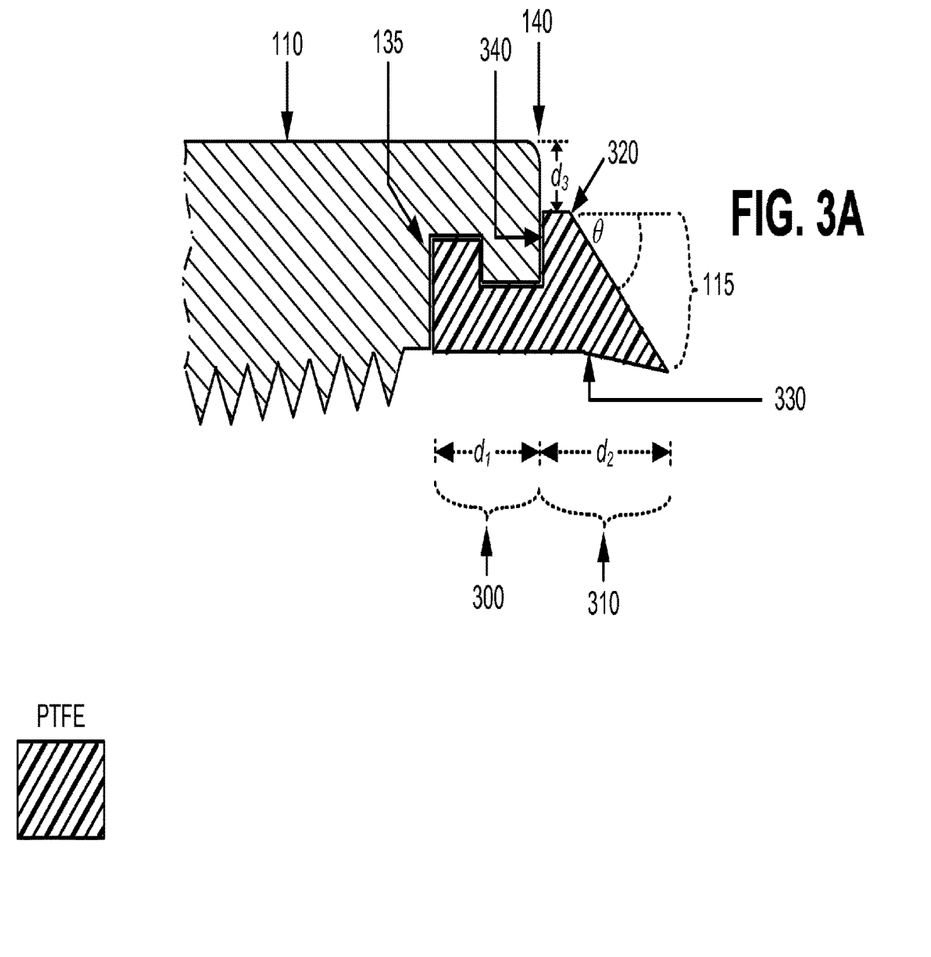
FIGS. 3A-3C illustrate cross-sectional views of details of the wiper seal of FIG. 1A according to different exemplary implementations.

FIG. 3A illustrates a cross-sectional view of details of wiper seal 115 according to a first exemplary implementation. As shown, wiper seal 115 may include a tongue 300 and a wiper seal lip 310. In this exemplary implementation, tongue 300 may have an L-shaped cross section for fitting into the radial notch of counterbore 135 on the cylindrical inner surface of the outer rim of conduit hub body 110. Tongue 300 may span a length $d_1$ from an edge of counterbore 135 to outer rim 140 of hub body 110. Wiper seal lip 310 includes a roughly triangular cross-section, with an upper vertex of the triangular cross-section being truncated to a flat upper portion 320. The angular outer surface of wiper seal lip 130 extends downwards at an angle (90°−θ° from outer rim 140 of hub body 110, where θ may range from about 40-50°. Wiper seal lip 310 may include a lower edge that spans a length $d_2$ from outer rim 140 of hub body 110. Flat upper portion 320 of wiper seal lip 310 extends upward along the outer rim of hub body 110 to within a distance $d_3$ from the outer surface of conduit hub body 110. Sealing between wiper seal 115 occurs when conduit 105 (not shown in FIG. 3A) is inserted through seal internal surface 330. Since the outer diameter of conduit 105 is larger than the inner diameter of seal internal surface 330, wiper seal 115 is caused to stretch, reducing angle θ and thereby compressing a rimward surface 340 of upper portion 320 of wiper seal 115 against outer rim 140 of hub body 110.

Wiper seal 115 may, for example, be "snapped" into the radial notch of counterbore 135 in conduit hub body 110 using mechanical force (e.g., by hand). In this embodiment, wiper seal 115 may be removed at a later time, and replaced with a new wiper seal using mechanical force to extract the wiper seal from the radial notch of counterbore 135, and to insert the new wiper seal back into the radial notch of counterbore 135. Wiper seal 115 may be, in other embodiments, set into counterbore 135 in other ways. For example, in one embodiment, glue may be used to affix wiper seal 115 into the radial notch of counterbore 135, where the glue is appropriate for the material with which wiper seal 115 is made.

Figure 3B:
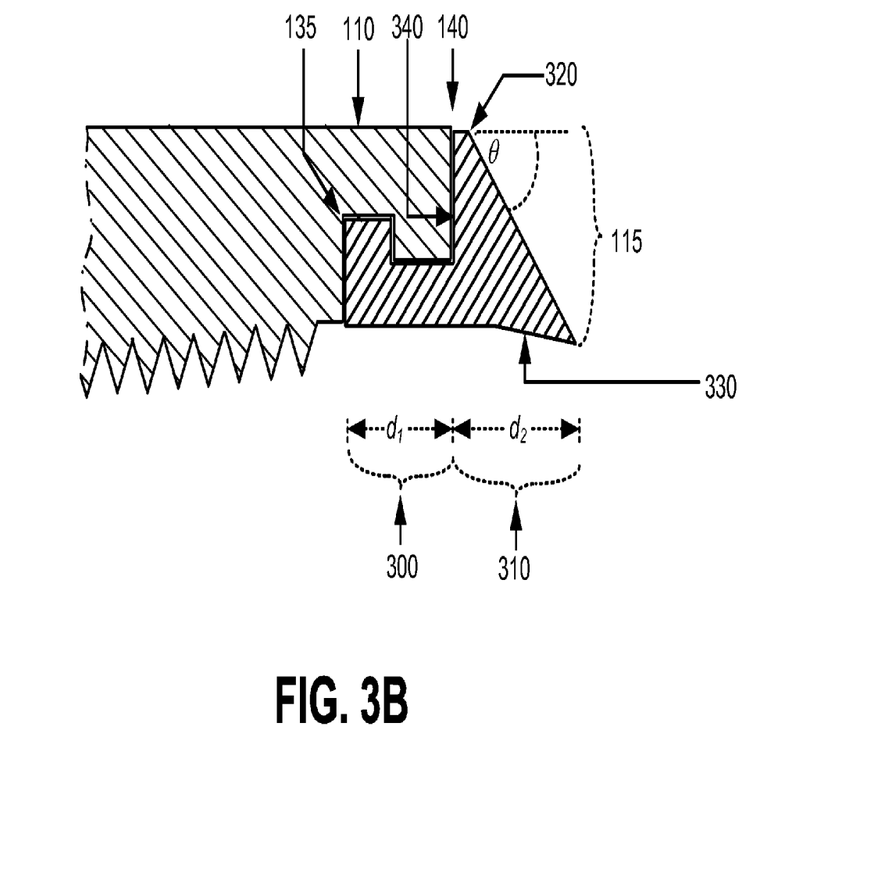

FIG. 3B depicts a cross-sectional view of details of wiper seal 115 according to another exemplary implementation. In this exemplary implementation, wiper seal 115 may be configured slightly differently than the implementation of FIG. 3A. As shown in FIG. 3B, flat upper portion 320 of wiper seal lip 310 extends upwards such that it is co-planar with the outer surface of conduit hub body 110. Similar to the implementation of FIG. 3A, tongue 300 of wiper seal 115 may have an L-shaped cross section for fitting into the radial notch of counterbore 135 on the cylindrical inner surface of the outer rim of conduit hub body 110. Tongue 300 may span a length $d_1$ from an edge of counterbore 135 to outer rim 140 of hub body 110. Wiper seal lip 310 includes a roughly triangular cross-section, with an upper vertex of the triangular cross-section being truncated to flat upper portion 320. The angular outer surface of wiper seal lip 130 extends downwards at an angle (90°−θ°) from outer rim 140 of hub body 110, where θ may range from about 40-50°. Wiper seal lip 310 may include a lower edge that spans a length $d_2$ from outer rim 140 of hub body 110. Similar to the exemplary implementation of FIG. 3A, sealing between wiper seal 115 occurs when conduit 105 (not shown in FIG. 3B) is inserted through seal internal surface 330. Since the outer diameter of conduit 105 is larger than the inner diameter of seal internal surface 330, wiper seal 115 is caused to stretch, reducing angle θ and thereby compressing a rimward surface 340 of upper portion 320 of wiper seal 115 against outer rim 140 of hub body 110.

Figure 3C:
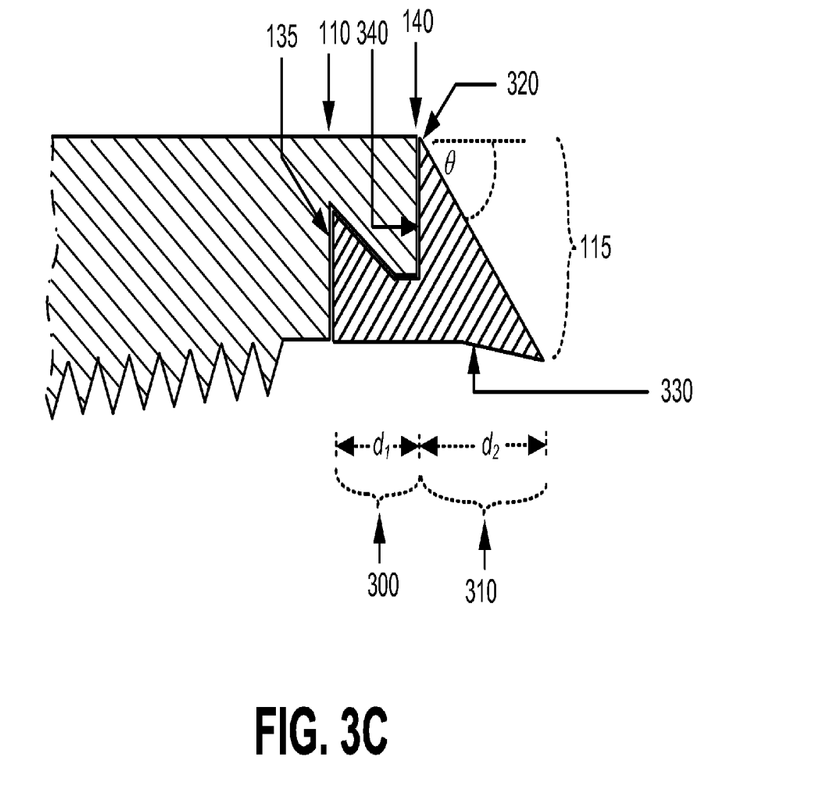

FIG. 3C depicts a cross-sectional view of details of wiper seal 115 according to a third exemplary implementation. In this exemplary implementation, counterbore 135 and tongue 300 of wiper seal 115, and wiper seal lip 310, have different configurations than the implementations of FIGS. 3A and 3B. As shown, tongue 300 has a roughly triangular-shaped cross-section that fits into a corresponding configuration of the radial notch of counterbore 135. Tongue 300 may span a length $d_1$ from an edge of counterbore 135 to outer rim 140 of hub body 110. The angular outer surface of wiper seal lip 130 extends downwards at an angle (90°−θ°) from outer rim 140 of hub body 110, where θ may range from about 40-50°. The outer surface of wiper seal lip 130 extends downwards in a linear fashion, at the angle (90°−θ°), from the upper surface of outer rim 140 of conduit hub body 110 to the lower surface of wiper seal 115. Wiper seal lip 310 may include a lower edge that spans a length $d_2$ from outer rim 140 of hub body 110. Similar to the exemplary implementations of FIGS. 3A and 3B, sealing between wiper seal 115 occurs when conduit 105 (not shown in FIG. 3C) is inserted through seal internal surface 330. Since the outer diameter of conduit 105 is larger than the inner diameter of seal internal surface 330, wiper seal 115 is caused to stretch, reducing angle θ and thereby compressing a rimward surface 340 of upper portion 320 of wiper seal 115 against outer rim 140 of hub body 110.

A conduit hub is described herein that includes a wiper seal inserted into an inner surface of an outer rim of the conduit hub body such that, when a conduit is threaded into the conduit hub body, the wiper seal seals against the smooth outer surface of the conduit. Use of the wiper seal with the conduit hub, thus, resists the ingress of moisture, dirt and contaminants by keeping a tight seal against the smooth outer diameter of the conduit. The conduit hub, with the wiper seal, may have an IP69K rating in the IEC 60529 rating system or a NEMA 4× rating.

The foregoing description of implementations provides illustration and description, but is not intended to be exhaustive or to limit the invention to the precise form disclosed. Modifications and variations are possible in light of the above teachings or may be acquired from practice of the invention. No element used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An apparatus, comprising:
a cylindrical conduit having an end that includes a male thread;
a conduit hub body having a first end configured to connect to a junction box or an enclosure of a conduit system, and a second end comprising a cylindrical inner surface configured to receive the end of the cylindrical conduit that includes the male thread, wherein the conduit hub body includes a female thread and a counterbore formed in an outer rim of the cylindrical inner surface, the female thread sized for threaded engagement with the male thread; and
a wiper seal constructed from a stretchable material and having a lip, a tongue, and an internal seal surface, at least a portion of an outer portion of the lip having a size larger than the cylindrical inner surface, the tongue shaped to selectively securely engage the counterbore, at least a portion of the lip positioned at an axial distance from the tongue to extend beyond the outer rim of conduit hub body, the internal seal surface being resiliently stretchable between a first size and a second size, the second size being larger than the first size and sized to form a first sealing surface about an outer surface of the cylindrical conduit, the first sealing surface sized to resist the ingress of moisture, dirt and contaminants into the conduit hub body and the cylindrical conduit, the lip having a first shape when the internal seal surface is at the first size and a second shape when the internal seal surface is at the second size, the first shape being different than the second shape, the lip further having a compression surface structured to exert a compressive force against the outer rim of the conduit hub body when the lip is at the second shape that is greater than a compressive force exert by the compression surface against the outer rim of the conduit hub body when the lip is at the first shape.

2. A conduit hub, comprising:
a hub body having a cylindrical inner surface configured to receive a cylindrical conduit having a male thread, wherein the hub body includes a female thread and a radial notch of a counterbore that circumscribes an outer rim of the cylindrical inner surface; and
a wiper seal having a lip and a tongue, at least a portion of an outer portion of the lip having a size larger than the cylindrical inner surface, the tongue shaped to securely, and selectively removably, engage the radial notch of the counterbore the lip axially extending away from the tongue by a distance sized to accommodate placement of at least a portion of the lip beyond the outer rim of the hub body as the lip securely engages the radial notch,
wherein the tongue of the wiper seal and the radial notch each having mating shapes that are structured for the mating engagement of the tongue with the radial notch by a snap fit,
wherein the wiper seal further includes an internal seal surface, the internal seal surface being resiliently stretchable between a first size and a second size, the second size being larger than the first size and sized to form a first sealing surface about the outer surface of the cylindrical conduit the second size of the first sealing surface further being sized to resist passage of dirt, contaminants, pressurized water, and steam through the wiper seal,
the lip having a first shape when the internal seal surface is at the first size and a second shape when the internal seal surface is at the second size, the first shape being different than the second shape, the lip further having a compression surface structured to exert a compressive force against the outer rim of the conduit hub body when the lip is at the second shape that is greater than a compressive force exert by the compression surface against the outer rim of the conduit hub body when the lip is at the first shape.

3. The conduit hub of claim 2, wherein the radial notch has a triangular-shaped cross-section into which fits a corresponding triangular-shaped cross-section of the tongue and wherein an outer surface of the wiper seal lip extends linearly downwards at an angle from an upper surface of the outer rim of the hub body to a lower surface of the wiper seal lip, wherein the angle is equal to a value of 90° minus 0° and wherein 0 ranges from 40-50°.

4. The conduit hub of claim 2, wherein the tongue has an L-shaped or triangular-shaped cross-section, and further wherein the first sealing surface is sized to resist the ingress of the pressurized water and steam into the interior of the hub body and the interior of the cylindrical conduit during pressurized water and steam cleaning, including 80 degrees Celsius water sprayed from a spray nozzle at 80-100 bar at a flow rate of 14-16 liters/minute with the spray nozzle held 10-15 centimeters from the hub body at angles of 0, 30, 60 and 90 degrees for 30 seconds at each of the angles.

5. The conduit hub of claim 2, wherein the wiper seal comprises food-grade polytetrafluoroethylene (PTFE).

6. The conduit hub of claim 2, wherein the hub body has a first end configured to connect to a junction box or an enclosure of a conduit system, and a second end that includes the cylindrical inner surface.

7. The conduit hub of claim 2, wherein the tongue of the wiper seal has an L-shaped or triangular-shaped cross-section.

8. The conduit hub of claim 2, wherein the tongue of the wiper seal is configured to be snapped into the radial notch of the counterbore via application of mechanical force.

9. The conduit hub of claim 8, wherein the tongue of the wiper seal is configured to be detachable such that, after being snapped into the radial notch of the counterbore, the tongue of the wiper seal is removable, via application of mechanical force, for replacement with a new wiper seal.

10. A conduit hub, comprising:
a conduit hub body having a first end configured to connect to a junction box or an enclosure of a conduit system, and a second end comprising a cylindrical inner surface configured to receive an end of a cylindrical conduit having a male thread, wherein the conduit hub body includes a female thread and a counterbore formed in an outer rim of the cylindrical inner surface; and a wiper seal having a lip, at least a portion of an outer portion of the lip having a size larger than the cylinder inner surface, the wiper seal having a length sized for a portion of the wiper seal to both securely, and selectively removably, engage a portion of the counterbore and the lip to extend beyond the outer rim of conduit hub body, at least a portion of the lip defining an internal seal surface along at least a portion of the length of the wiper seal, the internal seal surface being resiliently stretchable between a first size and a second size, the second size being larger than the first size and sized to form a first sealing surface about an outer surface of the cylindrical conduit, the first sealing surface being sized to resist the ingress of moisture, dirt and contaminants into the conduit hub body and the cylindrical conduit, the lip having a first shape when the internal seal surface is at the first size and a second shape when the internal seal surface is at the second size, the first shape being different than the second shape, the lip further having a compression surface structured to exert a compressive force against the outer rim of the conduit hub body when the lip is at the second shape that is greater than a compressive force exert by the compression surface against the outer rim of the conduit hub body when the lip is at the first shape.

11. The conduit hub of claim 1, wherein the wiper seal comprises food-grade polytetrafluoroethylene (PTFE).

12. The conduit hub of claim 10, wherein the counterbore includes a radial notch that circumscribes the outer rim of the cylindrical inner surface of the conduit hub body, and wherein the first sealing surface between the wiper seal and the outer surface is structured to resist ingress of water and steam into an interior of the hub body and an interior of the cylindrical conduit from pressurized water and steam cleaning, including 80 degrees Celsius water sprayed from a spray nozzle at 80-100 bar at a flow rate of 14-16 liters/minute with the spray nozzle held 10-15 centimeters from the hub body at angles of 0, 30, 60 and 90 degrees for 30 seconds at each of the angles.

13. The conduit hub of claim 12, wherein the wiper seal includes a tongue and a wiper seal lip and wherein the radial notch has a triangular-shaped cross-section into which fits a corresponding triangular-shaped cross-section of the tongue and wherein an outer surface of the wiper seal lip extends linearly downwards at an angle from an upper surface of the outer rim of the conduit hub body to a lower surface of the wiper seal lip, wherein the angle is equal to a value of 90° minus 0° and wherein 0 ranges from 40-50°.

14. The conduit hub of claim 1, wherein the wiper seal is configured to be snapped into the counterbore via application of mechanical force.

15. The conduit hub of claim 14, wherein the wiper seal is configured to be detachable such that, after being snapped into the counterbore, the wiper seal is removable, using mechanical force, for replacement with a new wiper seal.

16. The conduit hub of claim 10, wherein the wiper seal includes a tongue.

17. The conduit hub of claim 16, wherein the tongue of the wiper seal is configured to snap into place, via application of mechanical force, in the counterbore formed in the outer rim of the cylindrical inner surface of the conduit hub body.

18. The conduit hub of claim 16, wherein the tongue has an L-shaped or triangular-shaped cross-section, at least a portion of the tongue sized to securely engage the radial notch in the cylindrical inner surface of the conduit hub body.

19. The conduit hub of claim 16, wherein the tongue of the wiper seal is configured to be glued into place in the counterbore formed in the outer rim of the cylindrical inner surface of the hub body to affix the tongue of the wiper seal within the counterbore.

* * * * *